US012127693B2

United States Patent

(12) United States Patent
Boon et al.

(10) Patent No.: US 12,127,693 B2
(45) Date of Patent: Oct. 29, 2024

(54) FREESTANDING FLOOR DISPLAY OF CONSUMER PRODUCTS

(71) Applicant: Kimberly-Clark Worldwide, Inc., Neenah, WI (US)

(72) Inventors: Jason R. Boon, Appleton, WI (US); Jaime Prafke, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 262 days.

(21) Appl. No.: 17/621,016

(22) PCT Filed: Jun. 28, 2019

(86) PCT No.: PCT/US2019/039731
§ 371 (c)(1),
(2) Date: Dec. 20, 2021

(87) PCT Pub. No.: WO2020/263268
PCT Pub. Date: Dec. 30, 2020

(65) Prior Publication Data
US 2022/0330725 A1 Oct. 20, 2022

(51) Int. Cl.
*A47F 7/28* (2006.01)
*B65D 5/42* (2006.01)
(Continued)

(52) U.S. Cl.
CPC ............ *A47F 7/281* (2013.01); *B65D 5/4212* (2013.01); *B65D 71/0096* (2013.01);
(Continued)

(58) Field of Classification Search
CPC .. A47F 7/281; A47F 7/28; B65D 5/42; B65D 5/4212; B65D 71/00; B65D 71/0096; B65D 2203/00; B65D 2571/00061; G09F 23/06
(Continued)

(56) References Cited

U.S. PATENT DOCUMENTS 5,430,992 A * 7/1995 Olson ..................... B65B 17/02 53/399
7,527,152 B2 5/2009 Lentner et al.
(Continued)

FOREIGN PATENT DOCUMENTS

WO 2007074412 A2 7/2007

OTHER PUBLICATIONS

United Barcode Systems, Automatic, Real-Time Labeling on Secondary Packaging (Boxes, Bags, Packs), https://www.ubscode.com/en-ww/application/3/automatic-labeling-of-secondary-packaging.

*Primary Examiner* — Bryon P Gehman
(74) *Attorney, Agent, or Firm* — KIMBERLY-CLARK WORLDWIDE, INC.

(57) ABSTRACT

Disclosed are freestanding displays of packaged consumer products, particularly consumer paper products. The packaged consumer goods generally comprise one or more goods disposed in a container, such as a folded paperboard box or film overwrap, having a plurality of graphic elements on the various container panels. The graphic elements are preferably disposed such that at least two panels are visually similar and two panels are visually distinct. The containers may be stacked in arrays to form a display having two faces that are visually similar and end faces that are visual mirror images of one another. The present freestanding display helps consumers recognize the packaged products from a distance even when displayed amongst other packaged goods in a crowded supermarket or club store.

26 Claims, 5 Drawing Sheets

(51) Int. Cl.
*B65D 71/00* (2006.01)
*G09F 23/06* (2006.01)

(52) U.S. Cl.
CPC .......... *G09F 23/06* (2013.01); *B65D 2203/00* (2013.01); *B65D 2571/00061* (2013.01)

(58) Field of Classification Search
USPC ........................................................ 206/459.5
See application file for complete search history.

(56) References Cited

U.S. PATENT DOCUMENTS 7,572,249 B2 * 8/2009 Betts ........................ G09F 23/00 206/440
8,118,164 B2 * 2/2012 Brown ....................... G09F 7/00 40/606.15
8,602,213 B2 * 12/2013 Lowery .............. B65D 71/0096 206/386
2003/0234199 A1 12/2003 Morita et al.
2005/0092554 A1 5/2005 McGillin et al.
2007/0095705 A1 5/2007 Legault et al.
2007/0235263 A1 10/2007 Legault et al.
2007/0253920 A1 11/2007 Coulter et al.
2008/0053857 A1 3/2008 Albano et al.
2008/0105593 A1 * 5/2008 Kleinsmith ........ B65D 71/0096 206/736
2009/0008271 A1 1/2009 Zimmer et al.
2010/0294760 A1 11/2010 Butler et al.
2010/0320109 A1 12/2010 Trumbauer et al.
2011/0094979 A1 * 4/2011 Lowery .............. B65D 71/0096 108/51.11
2011/0139653 A1 * 6/2011 Kleinsmith ........ B65D 71/0096 206/386
2012/0205272 A1 * 8/2012 Heilman ................ B65D 75/38 206/391
2014/0262889 A1 9/2014 Wahrmund

* cited by examiner

FREESTANDING FLOOR DISPLAY OF CONSUMER PRODUCTS

BACKGROUND

Freestanding floor displays are common in large stores, especially supermarkets and club stores, where many thousands of products are placed on the store floor for display and shopping. These displays often include packages of consumer goods stacked on a supporting medium, such as a pallet, rather than a permanent fixture, such as a store shelf. Such displays often serve a dual purpose of prominently displaying and promoting the packaged consumer goods. To be effective however, the packages must be easily recognizable, even when stacked with other packages, and when a portion of the packages have been shopped.

In certain instances, to increase visibility and improve the shopability of the packaged products, special advertising materials such as auxiliary banners may be added to the displays. These additional materials, however, add an extra expense and require additional maintenance by store personnel. The materials may also become ineffective or unsightly once a portion of the packages are removed from the display.

In other instances, to increase visibility and improve the shopability of the packaged products, the packages themselves may be specifically designed to be stacked together with other packages and displayed on a store floor. For example, the packages may have virtually identical graphics disposed on each package faces so that they have a similar appearance when viewed from different perspectives. Further, the graphics may provide the display with an attractive uniform appearance, even when a portion of the packages have been removed. An additional benefit of such displays is that they may be loaded on the floor in multiple orientations, reducing the amount of care and attention required by store employees when placing the display on the store floor. While providing certain advantages however, such packaging limits the amount of information that can be communicated to the shopper as the package panels need to be virtually identical.

Accordingly, there remains a need for freestanding floor displays, particularly freestanding displays of packaged consumer goods, that both enhances the visibility and recognition of the goods and makes it easier for a shopper to select the correct product. There also remains a need for freestanding displays that are easy for retailers to maintain and organize.

SUMMARY

It has now been found that the appearance and shopability of a freestanding display of packaged consumer goods may be improved by providing package graphics and a stacking configuration that produces a display having two faces that are visually similar and end faces that are visual mirror images of one another. The present freestanding display helps consumers recognize the packaged products from a distance even when displayed amongst other packaged goods in crowded supermarkets, club stores, or the like.

Accordingly, in one embodiment, the present invention provides a product display system for packages of consumer products having enhanced visibility and recognition. The product display system comprises a plurality of packages of consumer goods stacked in rows and columns. For example, the display may comprise a first stacked product array positioned adjacent to a second stacked product array wherein all of the packages in the first stacked array have a first package orientation and all of the packages in the second stacked array have a second package orientation that is opposite that of the first package orientation. Orientating the arrays in this manner produces a display having end faces formed by different package panels, such as package back and front panels, while the front and back faces of the display may be formed entirely by package end panels.

In addition to orientating individual arrays of stacked packages such that the display end faces are formed by different package panels, the appearance and shopability of the product display system may be further improved by selectively applying graphics to the various package panels. For example, the package may comprise a front panel, a back panel and a pair of opposed end panels, wherein each of the panels have a plurality of graphic elements disposed thereon. The graphic elements may be disposed such that the front and back panels are visually distinct from one another and the end panels are visually similar.

By providing the packages with visually distinct front and back panels and visually similar first and second end panels, the amount of visual information that may be communicated to a consumer is increased compared to packages having visually similar graphics printed on each of the package panels. The amount of information communicated to a consumer is further enhanced by combining the foregoing packages into a display having display end faces formed by different package panels, such as both back and front panels, and front and back faces formed entirely by package end panels. Thus, in another embodiment, the present invention provides a product display system for displaying a plurality of individual packages where the display front and back faces are visually similar and the first and second end faces are visual mirror images of one another.

In another embodiment the present invention provides a product display system for displaying a plurality of individual packages of consumer products having a top panel, a bottom panel, a front panel, two side panels, and a back panel, the display having a front face, a back face, and first and second end faces, the product display system comprising: a first array of individual packages stacked in a first column and a first row, each package within the first array orientated in a first direction such that the package front panel forms a portion of the first end face of the display; a second array of individual packages stacked in a second column and a second row, each package within the second array orientated in a second direction that is opposite that of the first direction such that the package back panel forms a portion of the first end face of the display; and wherein the front face is formed from a plurality of package first end panels; the back face is formed from a plurality of package second end panels, the first end face is formed from a plurality of package front and back panels, and the second end face is formed from a plurality of package front and back panels.

In still another embodiment, the present invention provides a product display system for displaying a plurality of individual packages of consumer products having a front face, a back face, and first and second end faces, the product display system comprising: a plurality of packaged consumer products consisting of a plurality of consumer products disposed within a container, wherein each of the plurality of packaged consumer products have a package length and a package width that are substantially similar and each comprise a front panel, a back panel and first and second end panels, wherein each of the panels comprise a plurality of graphic elements disposed thereon and wherein the first and second end panels are visually similar to one another and the front and back panels are visually distinct from one another; a first array of packaged consumer products stacked in a first column and a first row, each package within the first array orientated in a first direction such that the package front panel forms a portion of the first end face of the display; and a second array of individual packages stacked in a second column and a second row, each package within the second array orientated in a second direction that is opposite that of the first direction such that the package back panel forms a portion of the first end face of the display.

In yet another embodiment the present invention provides a method of displaying packages of consumer products comprising: (a) providing a support medium having a length dimension and a width dimension, wherein the length dimension is greater than the width dimension; (b) providing a plurality of packages comprising a container and a consumer product disposed therein, wherein the containers have a front panel and an opposite back panel defining a package length, and a first end panel and an opposite second end panel defining a package width, wherein each of the panels comprise a plurality of graphic elements disposed thereon and wherein the first and second end panels are visually similar to one another and the front and back panels are visually distinct from one another; (c) stacking a first plurality of packages on the support medium in a first column and a first row to form a first stacked package array, wherein all of the packages in the first stacked package array have a first orientation; and (d) stacking a second plurality of packages on the support medium in a second column and a second row to form a second stacked package array, wherein all of the packages in the second stacked package array have a second orientation that is opposite to the first orientation; wherein the first and the second stacked package arrays form a display face formed from a plurality of package first end panels, a display back face formed from a plurality of package second end panels, a first display end face formed from a plurality of package front and back panels and a second display end face formed from a plurality of package front and back panels.

DEFINITIONS

Figure 1:
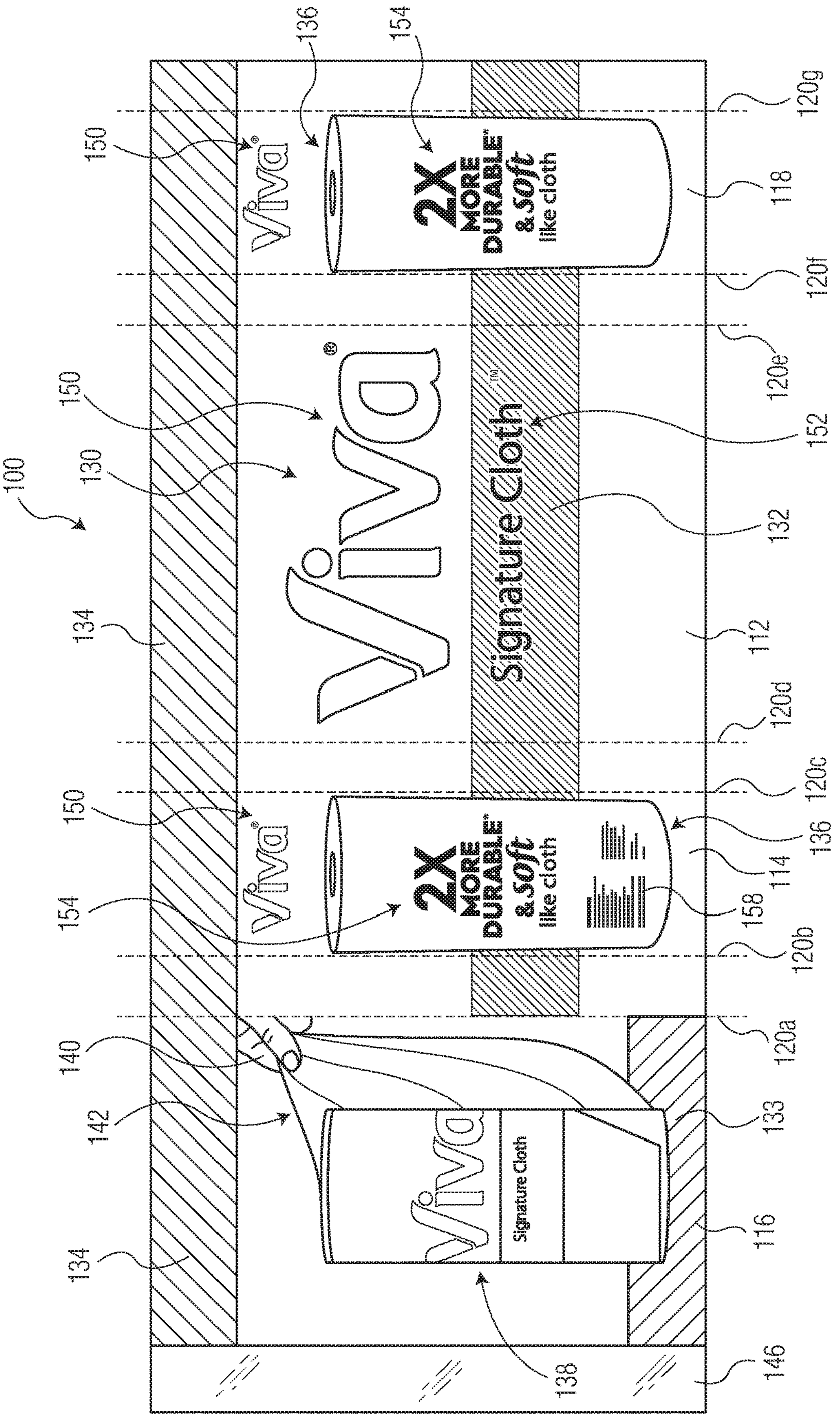
FIG. 1 is a plan view of four carton panels according to one embodiment of the present invention.

As used herein, the term "tissue product" refers to a wiping implement for post-urinary and/or post-bowel movement cleaning (toilet tissue product), for otorhinolaryngological discharges (facial tissue product) and/or multi-functional absorbent and cleaning uses (absorbent towel products such as paper towel products and/or wipe products). The tissue products of the present invention may be in any suitable form, such as in a roll, in individual sheets, in connected, but perforated sheets, in a folded format or even in an unfolded format.

As used herein, the term "container" generally refers to an assembly capable of containing a consumer good and more particularly an assembly for retaining, storing and displaying a plurality of consumer goods. Containers may be constructed from paper or plastic sheets, paperboard or other foldable paper materials, such as cardboard or corrugated cardboard.

As used herein, the term "graphic element" means any design, pattern, indicia (including textual indicia and non-textual indicia), character representation, active pose, logo or brand name. For example, with reference to FIG. 1, a container 100 of the present invention may include non-textual indicia such as a background pattern 130, first, second and third bands 132, 133, 134, first and second product representations 136, 138, a character representation 140 and an active pose 142, which are all graphic elements. The container may also include textual indicia such as a brand name 150, a sub-brand 152, a product descriptor 154, and legal disclosure 158, such as legally required product descriptions, an ingredient list, warnings, country of origin information, product quantity and size, all of which are graphic elements. A graphic element may be attached to the individual containers by any manner known in the art, such as printing, etching, laminating, gluing/adhesives, silk-screening, etc. In an embodiment herein, the visible graphic is formed as part of the individual container.

As used herein, the term "textual indicia" means a text indicia, such as a word and/or phrase that communicates to a consumer a property about a product, such as a tissue product, it is associated with. In one example, such as that illustrated in FIG. 1, a product may be housed in a container comprising a product descriptor 154, which may describe one or more product attributes like "2× MORE DURABLE & SOFT LIKE CLOTH."

As used herein, the term "brand name" means a single source identifier, in other words, a brand name identifies a product and/or service as exclusively coming from a single commercial source (i.e., company). One example of a brand name 150 shown in FIG. 1 is Viva®, which is also a trademark. Brand names are nonlimiting examples of textual indicia. The products of the present invention may be marketed and/or packaged under a common brand name (i.e., the same brand name, such as Viva®). In addition to the brand name, a sub-brand 152 may also be associated with the tissue products, such as "Signature Cloth" as shown in FIG. 1.

As used herein, "non-textual indicia" means a non-text indicia that communicates to a consumer through a consumer's senses. In one example, a non-textual indicia may communicate, even intuitively communicate, to a consumer through sight—a visual non-textual indicia. Nonlimiting examples of non-textual indicia include colors, patterns, textures such as emboss patterns and/or emboss pattern images or images of patterns, character representations, for example character representations exhibiting an active pose, and mixture thereof. With reference to FIG. 1, one example of a non-textual indicia is a background pattern 130, also referred to herein simply as a background, having a color and pattern that distinguishes the background pattern 130 from other graphic elements, such as the first, second and third bands 132, 133, 134 that overlay the background pattern 130.

As used herein, the term "product representation" means an image of a product contained within the container. For example, the container may contain a plurality of rolled towel products and the product representation may be an image of a single roll of the towel product 136 or 138 as shown in FIG. 1.

As used herein, the term "character representation" means an image of recognizable inanimate object or an entity such as an animal or a person, or one or more parts thereof, and mixtures thereof. Non-limiting examples of character representations include persons such as men, women and children, animals such as bears, dogs, puppies, cats, kittens and rabbits, and inanimate objects such as clouds, flowers, toilets, sinks, dishes, bubbles, windows, countertops, floors, and mixtures thereof.

As used herein, the term "active pose" means that the character representation communicates action or motion to a consumer. Non-limiting examples of active poses include stretching a tissue product between two hands of the character, wringing a tissue product by two hands, a character dispensing a tissue product and a character contacting the character's skin with a tissue product. In one example, an active pose 142 consists of a character representation 140, such as a hand, dispensing a tissue product, as shown in FIG. 1.

As used herein, the term "communicated" means that one or more graphic elements disposed on a container conveys information to a consumer about a product housed within the container. In one example, the information about the product may be conveyed intuitively to a consumer by a non-textual indicia.

As used herein, the term "visually distinct" when comparing the visual appearance of two panels of a container to one another means that 50% or fewer of the graphical elements disposed on a first panel are disposed on a second panel in a substantially similar manner, such as in a similar shape, size, scale and color. For example, with reference to FIG. 1, the back panel 116 is visually distinct from the front panel 112 because only three of seven graphic elements, namely the background pattern 130 and first and second bands 132, 134, disposed on the back panel 116 are also disposed on the front panel 112 in a substantially similar manner.

As used herein, the term "visually similar" when comparing the visual appearance of two panels of a container to one another means that more than 50% of the graphical elements disposed on a first panel are disposed on a second panel in a substantially similar manner, such as in a similar shape, size, scale and color. For example, with reference to FIG. 1, the first end panel 114 is visually similar to the second end panel 118 because six of the seven graphic elements disposed on the first end panel, namely the background pattern 130, first and second bands 132, 134, brand name 150, product representation 136 and product descriptor 154, are disposed on the second end panel 118 in a substantially similar manner.

DETAILED DESCRIPTION

The present invention provides freestanding displays of packaged consumer products, particularly consumer paper products, such as tissue products, and more particularly rolled tissue products, such as bath tissue or paper towels. The packages generally comprise consumer products disposed within a container, such as plastic or paper overwrap, boxes or cartons, which are then arranged in stacked arrays to form the display. In certain preferred embodiments all of the packages forming the display are similarly shaped and sized and have graphic elements, such as textual indicia and non-textual indicia, thereupon which identifies the product, provides information to the consumer, and may also provide aesthetic benefits. The displays are particularly well suited for use in sales channels such as supermarkets and club stores where many thousands of products are provided in freestanding floor displays which include packages stacked on a supporting medium, such as a pallet, rather than a permanent fixture such as a store shelf.

Accordingly, in one embodiment the present invention provides a freestanding floor display of packaged consumer products, particularly consumer paper products, such as tissue products, and more particularly rolled tissue products, such as bath tissue or paper towels, comprising a support medium, such as a pallet, and a plurality of substantially similar individual packages of consumer products stacked thereon. In certain instances, it may be preferable to stack the packages such that none of the packages are overlapping one another and the packages are arranged in arrays of rows and columns. Further, the packages within a given stacked array may be orientated such that the display front and back facings are visually similar. In this manner, the freestanding floor display may be placed on the store floor in several different orientations with similar visual affect.

With reference now to FIG. 1, one embodiment of a container 100 according to the present invention is illustrated. The container 100, which in certain instances may be a sheet of plastic or foldable paperboard, comprises four panels—a front panel 112, a first end panel 114, a back panel 116 and a second end panel 118. One of ordinary skill in the art will appreciate that when the container is assembled to contain a plurality of consumer products the resulting package may be orientated in any number of different ways such that what is designated in FIG. 1 as the back panel may be orientated to face a consumer viewing the package. As such, the designations, front, back and end, are merely used to describe the illustrated embodiment and are not met to limit or otherwise restrict the scope of the invention.

The panels 112, 114, 116, 118 are separated from one another by a plurality of fold lines **120*a*-120*g*. In the illustrated embodiment a pair of fold lines, such as fold lines 120*a*, 120*b*, separate panels, such as front panel 112 and first side panel 114**, however the invention is not so limited. One skilled in the art will appreciate that the configuration and number of fold lines may vary depending on the consumer products to be contained and the container material.

It is generally preferred that all the panels comprise a graphic element, which may be a design, pattern, indicia (including textual indicia and non-textual indicia), character representation, active pose, logo or brand name. In certain embodiments graphic elements may be selected from the group consisting of a design, a pattern, a character representation, a pose, a product representation, a brand name and a product descriptor. The number and types of graphic elements may vary amongst the panels, however, it is generally preferred that each panel comprise two or more graphic elements, more preferably three or more, still more preferably four or more and even more preferably five or more, such as from about four to twelve graphic elements.

In certain preferred embodiments, such as the embodiment illustrated in FIG. 1, the container 100 may comprise non-textual indicia such as a background pattern 130, one or more bands 132, 133, 134, product representations 136, 138, character representations 140, or an active pose 142. The container 100 may also comprise textual indicia such as a brand name 150, a sub-brand 152 or other textual indicia 154, 158. In certain instances, the textual indicia may include a product descriptor 154, which may describe one or more attributes of the packaged consumer goods, or legally required descriptions 158, such as an ingredient list, warnings, country of origin information, product quantity and size, and the like.

While it is generally preferred that all panels comprise a graphic element, certain portions of one or more carton panels may not contain a graphic. For example, as illustrated in FIG. 1, the back panel 116 may comprise an unprinted portion 146, which in certain preferred embodiments may be transparent. Providing a panel portion that is unprinted, or in certain preferred embodiments transparent, may provide the panel with a unique visual aesthetic and enable a consumer to view the packaged consumer product through the carton material.

Further, while all panels comprise a graphic element, it is generally preferred that at least two panels, and more preferably at least three panels, are visually distinct from one another. In a particularly preferred embodiment the front and back panels are visually distinct from one another. Panels that are visually distinct from one another may however, have one or more graphic elements that are common amongst the panels. For example, in certain embodiments, 10% or fewer of the front panel graphic elements may be substantially similar to graphic elements disposed on the back panel, such as 20% or fewer, such as 30% or fewer, such as 40% or fewer. In other embodiments the front panel may have four or fewer graphic elements that are disposed on the back panel in a substantially similar manner, such as three or fewer, such as two or fewer.

One non-limiting embodiment of a container 100 having front and back panels 112, 116 that are visually distinct despite having graphic elements that are substantially similar is illustrated in FIG. 1. In the illustrated embodiment the front panel 112 and the back panel 116 are visually distinct from one another despite each panel 112, 116 comprising a background pattern 130 and first and second bands 132, 134 that are substantially similar in terms of shape, size, scale, color and pattern. Despite these similarities the back panel 116 is visually distinct from the front panel 112 because only three of seven back panel graphic elements are disposed on the back panel 116, less than 50%, are also disposed on the front panel 112 in a substantially similar manner.

Just as it is preferred that the front and back panels are visually distinct from one another, in certain embodiments it may be preferable that the front and back panels are visually distinct from the end panels. For example, with continued reference to FIG. 1, the front panel 112 may be visually distinct from the first and second end panels 114, 118. The front panel 112 is visually distinct from the first and second end panels 114, 118 despite having the front panel 112 having three graphic elements—a background pattern 130 and first and second bands 132, 134—that are substantially similar in terms of shape, size, scale, color and pattern with those disposed on the first and second end panels 114, 118. Further the back panel 116 is visually distinct from the first and second end panels 114, 118 despite having two graphic elements—a background pattern 130 and first band 132—that are substantially similar in terms of shape, size, scale, color and pattern between the panels 116, 114, 118

While it may be preferable to provide a container having front and back panels that are visually distinct from one another, and in certain instances visually distinct from the end panels, it is generally preferred that the end panels themselves be visually similar. By providing containers having visually similar end panels, the containers may be arranged in a freestanding display to provide display facings that are also visually similar, as will be discussed in more detail below.

In certain preferred embodiment the end panels are visually similar to one another and have at least two, and more preferably at least three and still more preferably at least four substantially similar graphic elements. For example, with continued reference to FIG. 1, in one embodiment the first end panels 114 may have five graphic elements—a background pattern 130, first and second bands 132, 134, first product representation 124, a brand name 150 and a product descriptor 154—that are also disposed on the back panel 116 in a substantially similar manner.

The substantially similar graphic elements provide the end panels with a visually similar appearance, even though the panels may include one or more graphic elements that differ. For example, the first end panel 114 includes a textual indicia 158, which in certain instances may be legally required descriptions such as an ingredient list, warnings, country of origin information, product quantity and size, and the like, that is not found on the back panel 116. Despite this difference more than 50% the graphical elements disposed on a first end panel 114 are also disposed on the back panel 116 in a substantially similar manner, such as in a similar shape, size, scale and color.

Figure 2A:
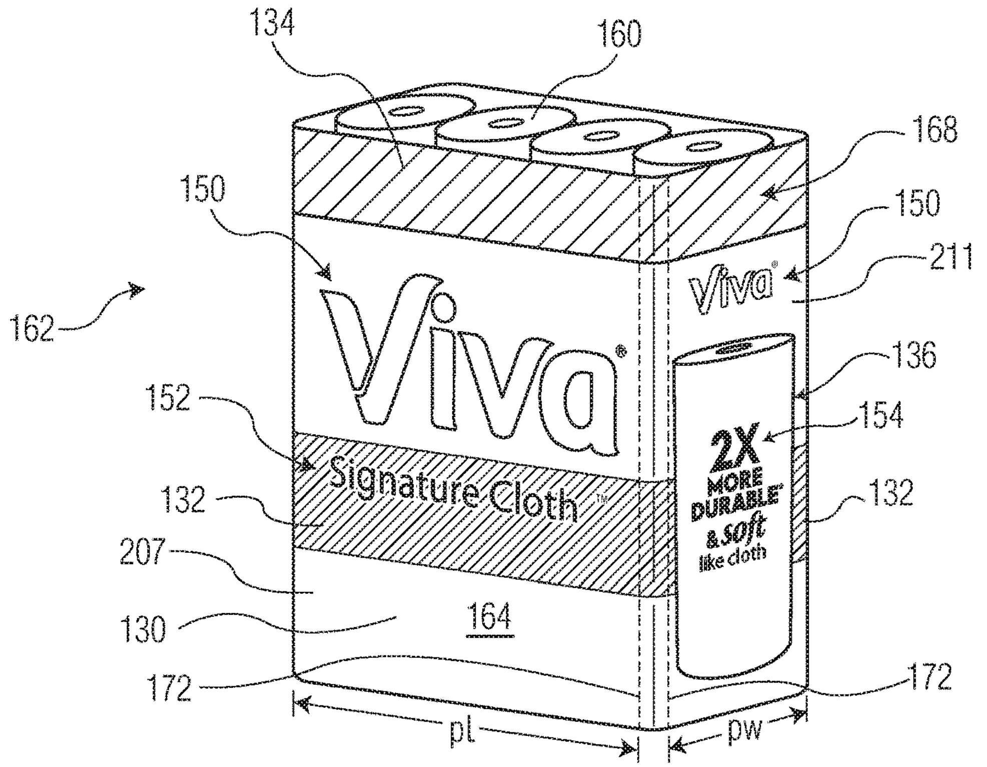
FIGS. 2A and 2B are perspective views of a cubic package of consumer products according to one embodiment of the present invention.
Figure 2B:
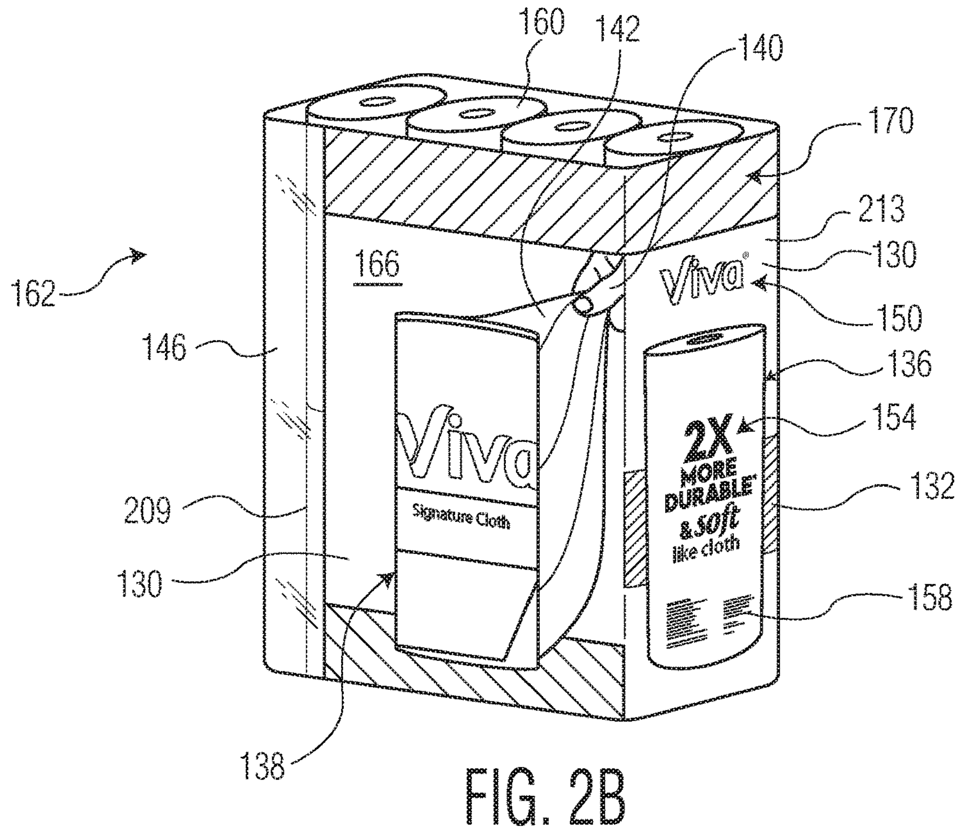

With reference now to FIGS. 2A and 2B, the container may be disposed about a plurality of consumer products, such as a plurality of rolled tissue products 160, to create a cubic package 162, having a package length (pl) and a package width (pw). Generally, the package length (pl) is the longest longitudinal dimension of the package 162. The front and back package panels 164, 166 have a length similar to the package length (pl) and are separated from first and second package end panels 168, 170 by one or more fold lines 172. The package 162 may be rotated about a vertical axis so that the various panels 164, 166, 168, 170 may be visible by a consumer. In the illustrated embodiments, the package 162 of FIG. 2A has been rotated 180 degrees about a package vertical axis to reveal the back panel 166 and second end panel 170 illustrated in FIG. 2B.

Generally, it is preferred that the package end panels 168, 170 are visually similar to one another. For example, as illustrated in FIGS. 2A and 2B, the end panels 168, 170 have graphic elements such as a background pattern 130, first and second bands 132, 134, brand name 150, product representation 136 and product descriptor 154 that are substantially similar in terms of shape, size, scale, color and pattern. The substantially similar elements provide the panels 168, 170 with a visually similar appearance, even though the second end panel 170 includes textual indicia 158 that is not found on the first end panel 168.

Unlike end panels 168, 170, it is generally preferred that the package front and back panels 164, 166 are visually distinct from one another. For example, as illustrated in FIGS. 2A and 2B, the panels 164, 166 only share two substantially similar graphic elements—a background pattern 130 and a first band 132—and less than 50% of the graphic elements disposed on one of the panels are not disposed on the other panel in a substantially similar manner. Thus, in certain preferred embodiments, the front and back panels are visually distinct and have four or fewer, such as three or fewer and more preferably two or fewer substantially similar graphic elements disposed thereon.

The advantage of providing visually distinct front and back panels is that the packaging may be used as a means of communicating, particularly intuitively communicating, more information about the packaged goods to the consumer. For example, with reference to FIGS. 2A and 2B, the front panel 164 may be used to communicate information about the brand by including both a brand name 150 and a sub-brand 152, and the back panel 166 may be used to communicate information about the packaged product, such as a product attribute, by including a product representation 138, a character 140 and an active pose 140. In this manner, the packaging may include multiple means of communicating to a consumer information about the packaged goods without having an abundance of different indicia on any one package panel. Thus, the package may maintain an overall aesthetic appearance without diminishing its ability to communicate to a consumer. Further, when graphics are arranged in this manner the resulting array of packages, particularly when stacked in a free-standing display, provide a continuous larger graphic that is both aesthetically pleasing and effectively communicates with consumers.

Individual packages of consumer goods may be stacked in arrays to form the display of the present invention. In certain embodiments the packages may be stacked by hand and in other embodiments they may be stacked by a machine during the production process. Preferably the stacked product display comprises a plurality of consumer goods packaged in a container, such as a cardboard box or a shrink-wrapped film. The container, which in certain instances may have a cubic shape, serves multiple purposes, such as protection of the packaged consumer goods during shipping and handling. In certain instances, the containers may be stacked to form the stacked product array and then over-wrapped with a film to protect the display during transport.

In certain embodiments both the cartons forming the display and the resulting freestanding display have a cubic shape. The cartons are stacked in rows and columns on top of a support medium, such as a pallet, to form a display that may be placed on a store floor and displayed without any additional infrastructure. When displayed on a store floor the display may be freestanding and displayed on its own, or multiple displays may be stacked one on top of the other to more efficiently use the floor space and increase the visibility of the display from a distance.

Figure 3:
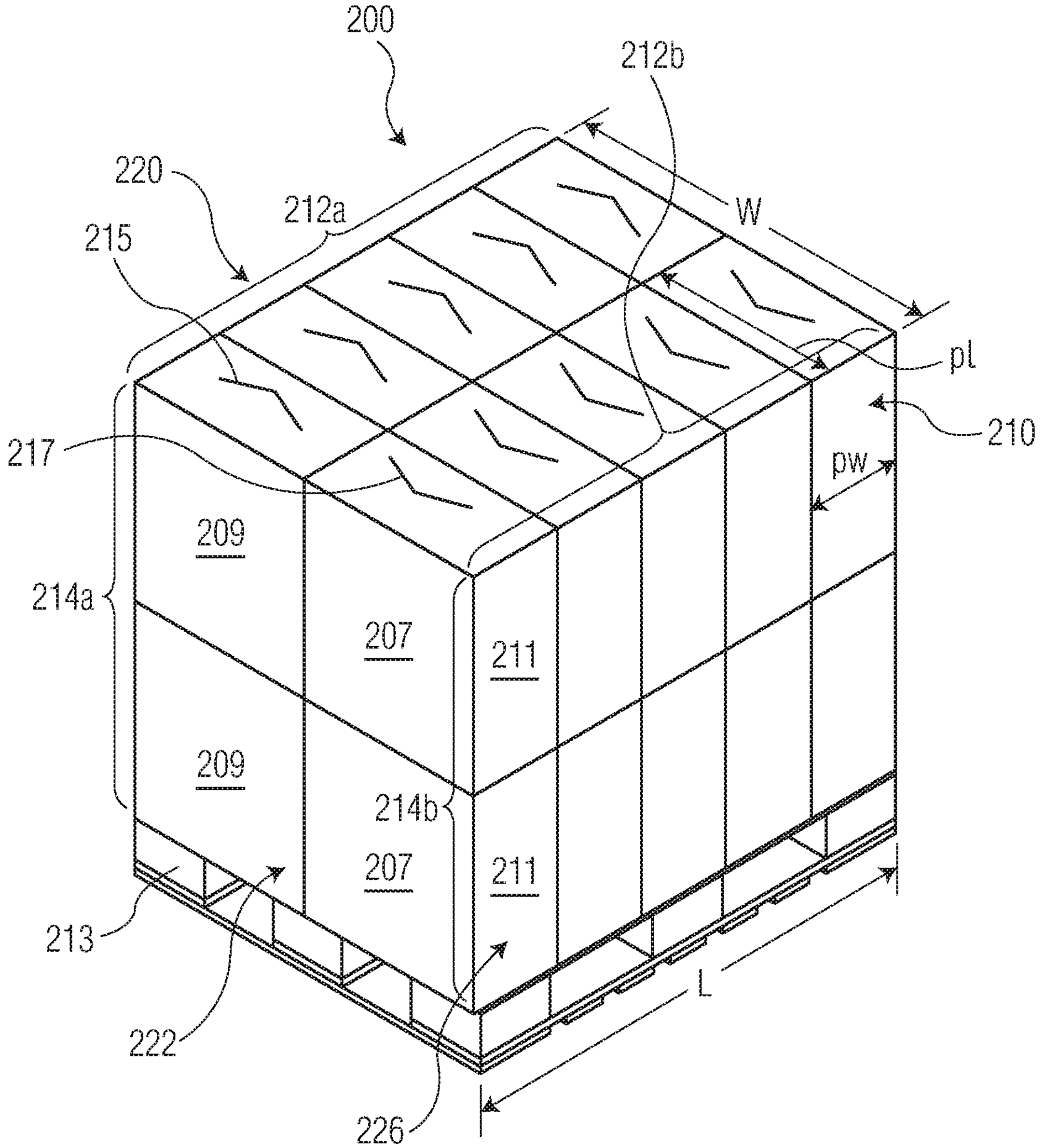
FIG. 3 is a perspective view of a product display system according to one embodiment of the present invention.

Turning now to FIG. 3, a free-standing display 200 may comprise a top 220, a bottom (not shown in FIG. 3), first end face 222, second end face 224 (not shown in FIG. 3), front face 226 and back face 228 (not shown in FIG. 3). The free-standing display 200 includes a plurality of packaged consumer products 210 on a support medium 213, such as a pallet.

The packaged consumer products 210, also referred to herein simply as packages, have a package length (pi) and a package width (pw), opposed front and back panels 207, 209 and opposed first and second end panels (first end panel 211 illustrated in FIG. 3). The packages 210 are stacked in rows, such as first and second rows 212*a*, 212*b*, and columns, such as first and second columns 214*a*, 214*b*. In the illustrated embodiment the first and second rows 212*a*, 212*b* each comprise five packages 210, however, the invention is not so limited, and the rows may comprise 3, 4, 5, 6, 7, 8 or more packages 210. Similarly, while the illustrated embodiment comprises columns, the first and second columns 214*a*, 214*b* each comprising two packages 210, the invention is not so limited and in alternate embodiments the columns may each comprise 3, 4, 5, 6, 7, 8 or more packages 210.

With continued reference to FIG. 3, the display 200 has a display height, a display width (W) and a display length (L) that are generally defined by the rows 212 and columns 214 of stacked packages 210 forming the display 200. In the illustrated non-liming embodiment illustrated in FIG. 3, the display is two packages 210 high, two packages 210 wide and five packages 210 long. These dimensions are merely illustrative and non-limiting and the number of packages forming a given dimension may vary depending on the dimension of individual packages and the desired overall size of the display.

Further, while the illustrated display 200 comprises two rows 212*a*, 212*b* and two columns 214*a*, 214*b*, the invention is not so limited and may comprise 2, 3, 4 or more columns and 2, 3, 4 or more rows. In other embodiments the display may comprise more rows than columns or more columns than rows. In certain embodiments the display may contain from 2 to about 9 rows. In other embodiments the display may contain from 2 to about 6 columns. Without intending to be limited by theory, it has been found that increasing both the height and width can significantly enhance visibility and recognition of individual packages in a display in a store-like environment, as compared to merely increasing height or width, alone.

In certain preferred embodiments each package 210 is removably stacked within display 200 such that it can be repeatedly removed and replaced with the same package or another package. In other preferred embodiments, such as illustrated in FIG. 3, the packages 210 are arranged such that packages 210 within a given row 212*a* do not overlap those in an adjacent row 212*b* and those within a given column 214*a* do not overlap packages in an adjacent column 214*b*.

With continued reference to FIG. 3, in one embodiment, the packages 210 are arranged within the display 200 such that their shortest dimension, generally the package width (pw), forms the longest dimension (L) of the free-standing display 200 and their longest dimension, generally the package length (pl), forms the shortest dimension, the free-standing display width (W). When packages are orientated and stacked in the foregoing manner the resulting display front and back faces may be formed by the package end panels and the first and second end faces may be formed by the package back and front panels. For example, the first end face 222 may be formed by front and back package panels 207, 209 and the front face 226 may be formed by first package end panels 211.

The packages 210 may further be stacked and arranged such that all of the packages 210 in a first row 212*a* and first column 214*a* are orientated in a first direction 215 and all of the packages 210 in a second, immediately adjacent, second row 212*b* and second column 214*b* are orientated in a second direction 217. Generally, it is preferred that the second direction 217 is one hundred and eighty degrees from the first direction 215, i.e., the first and second directions 215, 217 are opposite of one another.

When the packages 210 are arranged in the foregoing manner, the first end face 222 comprises a first column 214*a* facing formed by a plurality of package front panels 207 and a second column 214*b* facing formed by a plurality of package front panels 209. Thus, the display first end face 222 is formed by two different package panels 207, 209, unlike the display front face 226, which is formed entirely by first package end panels 211.

Figure 4:
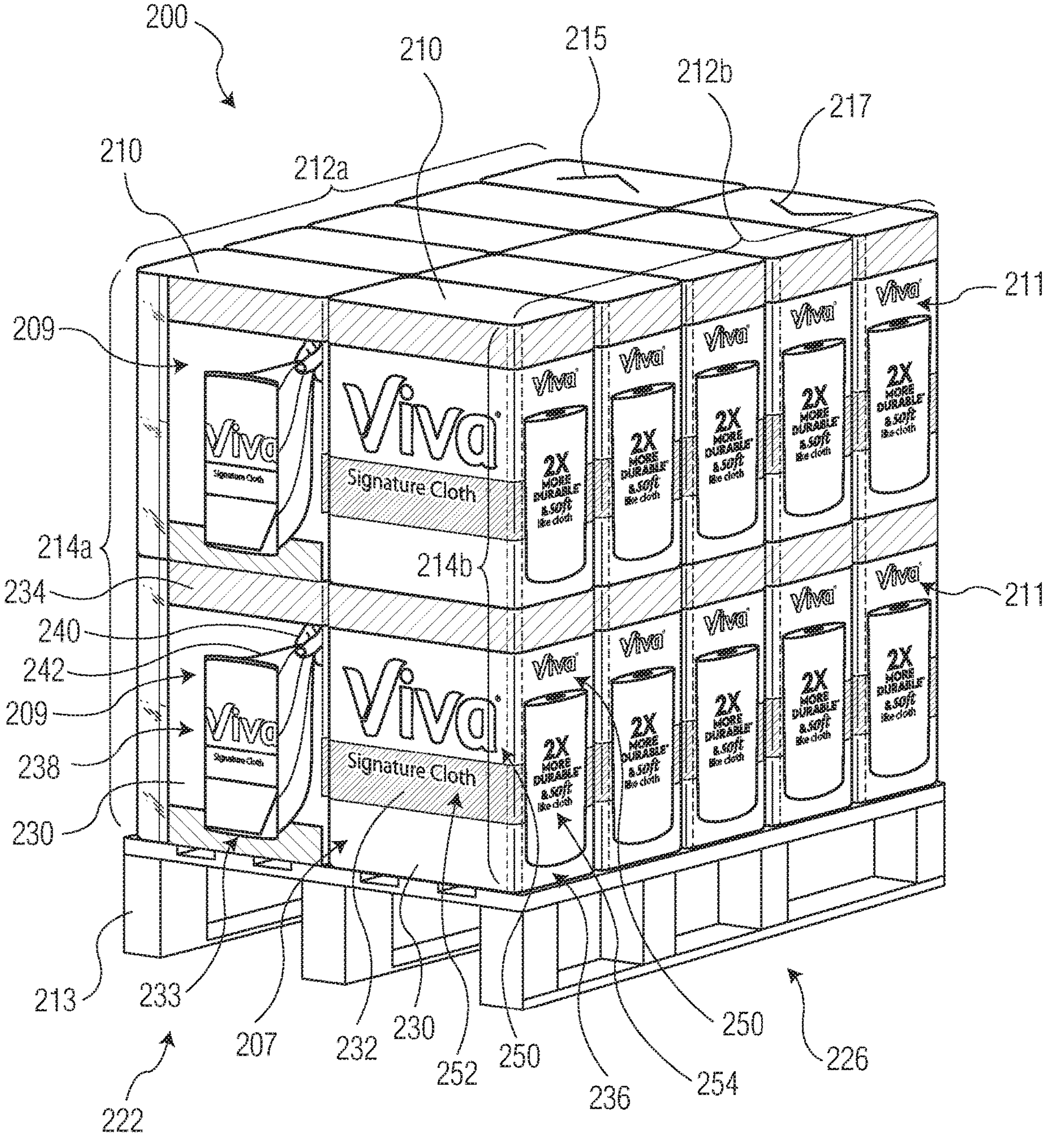
FIG. 4 is a perspective view of a freestanding display of consumer products according to one embodiment of the present invention.
Figure 5:
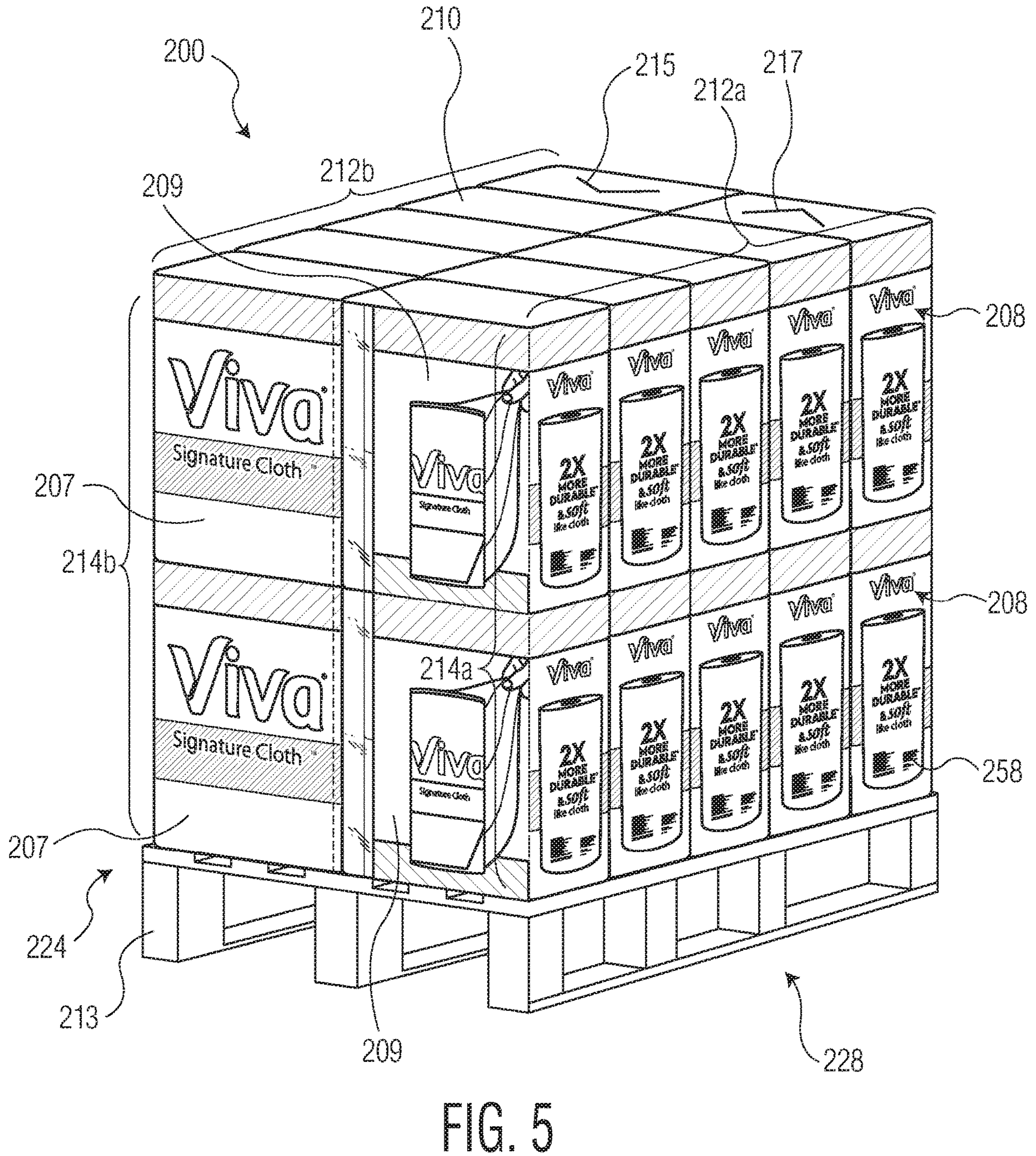
FIG. 5 is an alternate perspective view of the freestanding display of FIG. 4.

With reference now to FIGS. 4 and 5, the benefits of the foregoing arrangement of packages 210 to form the display 200 is apparent. The front face 226 consists entirely of package first end panels 211, which are visually similar to package second end panels 208, which form the entirety of the display back face 228 (visible in FIG. 5, which is a rotated view of the display 200 of FIG. 4). Because the front and back faces 226, 228 are visually similar, the display 200 may be placed on a store floor with either the front facing 226 or the back facing 228 orientated towards the shopper with similar visual effect. The ability of the display to be placed on the store floor in multiple orientations with the same visual effect simplifies placement of the display, saving store personnel time and effort, and presents a cohesive and consistent graphical display to the shopper.

Not only does the foregoing orientation of packages 210 provide front and back display faces 226, 228 that are visually similar, the first and second end faces of the display 222, 224 are also visually similar, albeit mirror images of one another. With continued reference to FIGS. 4 and 5, the packages 210 are stacked and orientated in a first array such that the package back panel 209 having a first plurality of graphic elements 230, 233, 234, 238, 240, 242 disposed thereon form a portion of both the first and second end faces of the display 222, 224. Another portion of the first and second ends 222, 224 is formed by a second plurality of packages 210 stacked and orientated in a second array such that the package front panel 207 having a second plurality of graphic elements 230, 232, 234, 250, 252 disposed thereon is visible to the consumer.

Thus, in certain preferred embodiments, the display 200 may comprise a first array of individual packages 210 stacked in a first row 212*a* and a first column 214*a*, each package 210 within the first array orientated in a first direction 215 such that the package front panel 207 forms a portion of the first end face 222. The display 200 may further comprise a second array of individual packages 210 stacked in a second row 212*b* and a second column 214*b*, wherein each package 210 within the second array is orientated in a second direction 217 that is opposite that of the first direction 215 such that the package back panel 209 forms a portion of the first end face of the display. In this manner the display end faces 222, 224 communicate a breadth of product information, while still maintain a display having a cohesive appearance and one that may be placed on a store floor in multiple orientations.

In the embodiment illustrated in FIGS. 4 and 5, each of the packages 210 comprise a plurality of graphic elements such as a background pattern 230, first and second bands 232, 234, first and second product representations 236, 238, a character 240, an active pose 242, a brand name 250, sub-brand 252, and textual indicia, such as a product descriptor 254. In certain embodiments all of the panels may include at least one graphic element, such as a background pattern 230 or a first band 232 that are visually similar in terms of shape, size, scale, color and pattern amongst the panels so as to draw consumers' attention to the display and provide for a visually aesthetic and cohesive display. Despite having one or two visually similar graphic elements that lend a cohesiveness to the display, it is generally preferred that the front and back panels 207, 209 are visually distinct from one another and that the display end faces 224, 226 do not appear as a unitary whole. Rather it is preferred that the end faces 224, 226 are formed from package front and back panels 207, 209 that communicate with a consumer through different means. For example, the first end 224 may be formed from two or more package back panels 209 stacked in a first column 214*a* and having a product representation 236, a character 240 and an active pose 242. The first end face 222 may also include two or more package front panels 207 stacked in a second column 214*b* and having a brand name 250 and a sub-brand 252.

In FIGS. 4 and 5 all the individual packages 210 comprise containers in the form of boxes, however other container forms and shapes are also useful herein. In certain embodiments the containers, such as boxes, may be cubic with two or more rectangular sides. In other instances, the containers have four rectangular sides and two square sides. While the individual containers may have a rectangular cross-section where the package length exceeds the package width, other shaped cross-sections are also contemplated and included herein. Additionally, while all of the packages within the illustrated displays are similar in shape and dimension, the invention is not so limited. In other embodiments the display may comprise packages having different shapes or dimensions.

In view of the foregoing description, it will be apparent to one of ordinary skill in the art that the following embodiments are within the scope of the present invention:

In a first embodiment the invention provides a freestanding display having a front face, a back face, a first end face and a second end face, the display comprising: a plurality of individual packages of consumer products, each package having a back panel, a front panel, a first end panel and a second end panel; a first array of individual packages stacked in a first column and a first row, each package within the first array orientated in a first direction such that the package front panel forms a portion of the first end face of the display; a second array of individual packages stacked in a second column and a second row, each package within the second array orientated in a second direction that is opposite that of the first direction such that the package back panel forms a portion of the first end face of the display.

In a second embodiment the invention provides the invention of the first embodiment wherein the display front face is formed from a plurality of package first end panels and the display back face is formed from a plurality of package second end panels.

In a third embodiment the invention provides the invention of either the first or the second embodiments wherein the display first and second end faces are visually mirror images of one another.

In a fourth embodiment the invention provides the invention of any one of the first through third embodiments wherein the display front and back faces are visually similar to one another.

In a fifth embodiment the invention provides the invention any one of the first through fourth embodiments wherein the packages are cubic, and the dimensions of each individual package are substantially similar.

In a sixth embodiment the invention provides the invention of any one of the first through fifth embodiments wherein each individual container is removably stacked.

In a seventh embodiment the invention provides the invention of any one of the first through sixth embodiments wherein the individual packages are stacked on a supporting medium.

In an eighth embodiment the invention provides the invention of any one of the first through seventh embodiments wherein each package panel comprises a plurality of graphic elements disposed thereon and wherein the first and second end panels are visually similar to one another and the front and back panels are visually distinct from one another.

In a ninth embodiment the invention provides the invention of any one of the first through eighth embodiments wherein the first and second end panels are visually distinct from the front and back panels.

In a tenth embodiment the invention provides the invention of any one of the first through ninth embodiments wherein the graphic elements are selected from textual indicia, non-textual indicia, and mixtures thereof.

In an eleventh embodiment the invention provides the invention of any one of the first through tenth embodiments wherein the graphic elements comprise non-textual indicia elected from the group consisting of colors, patterns, character, character representations exhibiting active poses, and mixtures thereof.

In a twelfth embodiment the invention provides the invention of any one of the first through eleventh embodiments wherein the plurality of individual packages comprise a plurality of rolled tissue products disposed in a container comprising paperboard or a plastic film.

What is claimed is:

1. A freestanding display having a front face, a back face, a first end face and a second end face, the display comprising:

a plurality of cubic, similarly sized, individual packages of consumer products, each of the individual packages having a back panel, a front panel, a first end panel and a second end, each of the individual package panels comprising a plurality of graphic elements disposed thereon such that the first and second end panels are visually similar to one another and the front and back panels are visually distinct from one another;

a first array of the individual packages stacked in a first column and a first row, each of the individual packages within the first array orientated in a first direction such that the individual package front panel forms a portion of the first end face of the display and the individual package first end panels form a portion of the front face of the display;

a second array of the individual packages stacked in a second column and a second row, each of the individual packages within the second array orientated in a second direction that is opposite that of the first direction such that the individual package back panel forms a portion of the first end face of the display and the individual package second end panels form a portion of the back face of the display.

2. The freestanding display of claim 1, wherein the display first and second end faces are visually mirror images of one another.

3. The freestanding display of claim 1, wherein the display front and back faces are visually similar to one another.

4. The freestanding display of claim 1, wherein each of the individual packages is removably stacked.

5. The freestanding display of claim 1, wherein the individual packages are stacked on a supporting medium.

6. The freestanding display of claim 1, wherein the first and second end panels are visually distinct from the front and back panels.

7. The freestanding display of claim 1, wherein the graphic elements are selected from textual indicia, non-textual indicia, and mixtures thereof.

8. The freestanding display of claim 1, wherein the graphic elements comprise non-textual indicia elected from the group consisting of colors, patterns, a product representation, a character, a character representation exhibiting an active pose, and mixtures thereof.

9. The freestanding display of claim 1, wherein the individual packages comprise a plurality of rolled tissue products disposed in a container comprising paperboard or a plastic film.

10. A product display system for displaying a plurality of individual packages of consumer products, the display having a front face, a back face, first and second end faces, a height, a length and a width, the display comprising:

a plurality of cubic, similarly sized, packages comprising a container and a consumer product disposed therein, wherein the container has a front panel and an opposite back panel defining a package length, and a first end panel and an opposite second end panel defining a package width, wherein each of the panels comprise a plurality of graphic elements disposed thereon and wherein the first and second end panels are visually similar to one another and front and back panels are visually distinct from one another;

a first array of packages stacked in a first column and a first row, each package within the first array orientated in a first direction such that the package front panel forms a portion of the first end face of the display; and a second array of packages stacked in a second column and a second row, each package within the second array orientated in a second direction that is opposite that of the first direction such that the package back panel forms a portion of the first end face of the display.

11. The product display system of claim 10, wherein the display length dimension is defined by the front and back faces, the front faces being formed by a plurality of package first end panels and the back face being formed by a plurality of package second end panels.

12. The product display system of claim 10, wherein the display width dimension is defined by the first and second end faces and wherein the first and second end faces are visually mirror images of one another.

13. The product display system of claim 10, wherein each of the plurality of packages are cubic and have dimensions that are substantially similar.

14. The product display system of claim 10, wherein each of the plurality of packages is removably stacked.

15. The product display system of claim 10, wherein the packages are stacked on a supporting medium.

16. The product display system of claim 10, wherein the graphic elements comprise non-textual indicia elected from the group consisting of colors, patterns, a product representation, a character, a character representation exhibiting an active pose, and mixtures thereof.

17. The product display system of claim 10, wherein the consumer products comprise a plurality of rolled tissue products and the containers comprise paperboard or a plastic film.

18. The product display system of claim 10, wherein the front and back panels are visually distinct from the first and second end panels.

19. The product display system of claim 10, wherein the first and second end panels have at least five graphic elements selected from the group consisting of a background pattern, a band, a product representation, a brand name and a textual indicia that are substantially similar in terms of shape, size, scale, color and pattern.

20. The product display system of claim 10, wherein 10% or fewer of the front panel graphic elements are substantially similar to graphic elements disposed on the back panel.

21. The product display system of claim 10, wherein the front and back panels comprise at least five graphic elements selected from the group consisting of a background pattern, a band, a product representation, a brand name and a textual indicia, and wherein two or fewer of the graphic elements are substantially similar in terms of shape, size, scale, color and pattern between the front and back panels.

22. A method of displaying packages of consumer products comprising:

providing a support medium having a length dimension and a width dimension, wherein the length dimension is greater than the width dimension;

providing a plurality packages comprising a container and a consumer product disposed therein, wherein the containers have a front panel and an opposite back panel defining a package length, and a first end panel and an opposite second end panel defining a package width, wherein each of the panels comprise a plurality of graphic elements disposed thereon, and wherein the first and second end panels are visually similar to one another and the front and back panels are visually distinct from one another;

stacking a first plurality of packages on the support medium in a first column and a first row to form a first stacked package array, wherein all of the packages in the first stacked package array have a first orientation;

stacking a second plurality of packages on the support medium in a second column and a second row to form a second stacked package array, wherein all of the packages in the second stacked package array have a second orientation that is opposite to the first orientation; and wherein the first and the second stacked package arrays form a display face formed from a plurality of package first end panels, a display back face formed from a plurality of package second end panels, a first display end face formed from a plurality of package front and back panels and a second display end face formed from a plurality of package front and back panels.

23. The method of claim 22, wherein the first and second stacked package arrays are at least two packages tall and at least four packages long.

24. The method of claim 22, wherein the consumer product is selected from the group consisting of facial tissues, bathroom tissues, paper towels and paper napkins.

25. The method of claim 22, wherein the first and second end faces are visually mirror images of one another.

26. The method of claim 22, wherein the front and back faces are visually similar to one another.

* * * * *